(12) United States Patent
Sifford et al.

(10) Patent No.: US 10,440,051 B2
(45) Date of Patent: Oct. 8, 2019

(54) ENHANCED DETECTION OF POLYMORPHIC MALICIOUS CONTENT WITHIN AN ENTITY

(71) Applicant: BANK OF AMERICA CORPORATION, Charlotte, NC (US)

(72) Inventors: Eric Eugene Sifford, Charlotte, NC (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 285 days.

(21) Appl. No.: 15/448,888

(22) Filed: Mar. 3, 2017

(65) Prior Publication Data

US 2018/0255073 A1    Sep. 6, 2018

(51) Int. Cl.
*H04L 29/06* (2006.01)
*G06F 16/22* (2019.01)

(52) U.S. Cl.
CPC ............ *H04L 63/145* (2013.01); *G06F 16/22* (2019.01); *H04L 63/1416* (2013.01)

(58) Field of Classification Search
None
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |
| 7,478,431 B1 * | 1/2009 | Nachenberg | G06F 21/565 |
| | | | 713/175 |
| 7,533,068 B2 | 5/2009 | Maassen van den Brink et al. | |
| 7,619,437 B2 | 11/2009 | Thom et al. | |
| 7,639,035 B2 | 12/2009 | Berkley | |
| 7,898,282 B2 | 3/2011 | Harris et al. | |
| 8,008,942 B2 | 8/2011 | van den Brink et al. | |
| 8,190,548 B2 | 5/2012 | Choi | |
| 8,195,596 B2 | 6/2012 | Rose et al. | |
| 8,283,943 B2 | 10/2012 | van den Brink et al. | |

(Continued)

FOREIGN PATENT DOCUMENTS

| | | |
|---|---|---|
| AU | 2010249233 A1 | 6/2011 |
| CA | 2886849 A1 | 10/2016 |

(Continued)

*Primary Examiner* — Henry Tsang
(74) *Attorney, Agent, or Firm* — Michael A. Springs; Moore & Van Allen PLLC; Anup Shrinivasan Iyer (57) ABSTRACT

Embodiments of the invention are directed to systems, methods and computer program products for enhanced detection of polymorphic malicious content within an entity. In this regard, the present invention receives information associated with an incidence of an electronic file; receives an first hash value of the electronic file from a first network device and a second hash value of the electronic file from a second network device; compares the first hash value with the second hash value; determines that the electronic file is polymorphic based on at least the match; initiates an execution of a quantum optimization algorithm using a quantum optimizer to determine one or more hash value states associated with the electronic file for a third network device; and initiates a control signal configured to store the one or more hash value states in a database associated with the third network device.

17 Claims, 2 Drawing Sheets

(56) References Cited

U.S. PATENT DOCUMENTS

| | | |
|---|---|---|
| 8,421,053 B2 | 4/2013 | Bunyk et al. |
| 8,744,075 B2 | 6/2014 | Tanaka |
| 8,769,683 B1* | 7/2014 | Oliver .................. G06F 21/561 719/311 |
| 8,897,449 B1 | 11/2014 | Broadbent |
| 9,207,672 B2 | 12/2015 | Williams et al. |
| 9,246,675 B2 | 1/2016 | Ding |
| 9,400,499 B2 | 7/2016 | Williams et al. |
| 9,537,660 B2 | 1/2017 | Wang et al. |
| 2004/0139000 A1 | 7/2004 | Amos |
| 2005/0010508 A1 | 1/2005 | Groz |
| 2005/0132205 A1* | 6/2005 | Palliyil ................ H04L 63/123 713/188 |
| 2006/0088157 A1 | 4/2006 | Fujii |
| 2006/0251247 A1 | 11/2006 | Akiyama et al. |
| 2012/0002008 A1 | 1/2012 | Valin et al. |
| 2012/0017275 A1* | 1/2012 | Harmonen ............. G06F 21/56 726/24 |
| 2013/0117200 A1 | 5/2013 | Thom |
| 2014/0214257 A1* | 7/2014 | Williams ................ G05D 1/00 701/25 |
| 2015/0379264 A1* | 12/2015 | Alme .................... G06F 21/564 726/23 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

ENHANCED DETECTION OF POLYMORPHIC MALICIOUS CONTENT WITHIN AN ENTITY

BACKGROUND

The nature of malicious code, or malware (e.g., viruses, worms, bots, or the like) have been used to disrupt network service. In the past, malware was designed primarily to propagate. The number of such intrusions and defenses multiplied when malware is designed to infiltrate a large number of machines networked together. A great deal of modern malware makes use of polymorphic techniques. In this regard, the malware frequently changes attack states or uses different file names, hashes, or signatures to encrypt or otherwise hide its code so as to avoid detection and eradication as it propagates through a network. There is a need for enhanced detection of such polymorphic malicious content as it propagates through the network of an entity.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for enhanced detection of polymorphic malicious content within an entity is presented. The system comprises at least one non-transitory storage device; at least one processor; and at least one module stored in said storage device and comprising instruction code that is executable by the at least one processor and configured to cause said at least one processor to: receive information associated with an incidence of an electronic file in a distributed network comprising one or more network devices; receive an first hash value of the electronic file from a first network device and a second hash value of the electronic file from a second network device, wherein the first network device and the second network device is associated with the one or more network devices; compare the first hash value with the second hash value to determine a match; determine that the electronic file is polymorphic based on at least determining that the first hash value at the first network device does not match the second hash value at the second network device; initiate an execution of a quantum optimization algorithm using a quantum optimizer to determine one or more hash value states associated with the electronic file for a third network device based on at least the first hash value, the second hash value, and information associated with the one or more network devices in the distributed network; and initiate a control signal configured to store the one or more hash value states in a database associated with the third network device.

In some embodiments, the module is further configured to: receive information associated with an incidence of the electronic file at a third network device, wherein the third network device is associated with the one or more network devices; receive a third hash value of the electronic file from the third network device; compare the third hash value with the one or more hash value states in the database to determine a match; and determine that the electronic file is malware based on at least determining a match between the third hash value and at least one of the one or more hash value states in the database.

In some embodiments, the module is further configured to: initiate an intrusion detection protocol configured to deny the electronic file access to the third network device based on at least determining that the electronic file is malware.

In some embodiments, the module is further configured to: receive information associated with an incidence of the electronic file at a third network device, wherein the third network device is associated with the one or more network devices; receive a third hash value of the electronic file from the third network device; compare the third hash value with the one or more hash value states in the database to determine a match; determine a partial match between the third hash value and the one or more hash value states in the database; and initiate a file quarantine process configured to temporarily restrict the electronic file access to the third network device.

In some embodiments, the module is further configured to initiate an alert on a user computing device indicating the initiation of the file quarantine process, and the restriction of the electronic file access.

In some embodiments, the module is further configured to: receive an indication from the user computing device indicating that the electronic file is malware; initiate an intrusion detection protocol configured to deny the electronic file access to the third network device based on at least receiving the indication that the electronic file is malware; and initiate a control signal configured to cause the third hash value to be added to the database.

In some embodiments, the module is further configured to be communicatively coupled to a quantum optimizer, thereby enabling the transmission and reception of information.

In another aspect, a computer program product for enhanced detection of polymorphic malicious content within an entity is presented. The computer program product comprising a non-transitory computer-readable medium comprising code causing a first apparatus to receive information associated with an incidence of an electronic file in a distributed network comprising one or more network devices; receive an first hash value of the electronic file from a first network device and a second hash value of the electronic file from a second network device, wherein the first network device and the second network device is associated with the one or more network devices; compare the first hash value with the second hash value to determine a match; determine that the electronic file is polymorphic based on at least determining that the first hash value at the first network device does not match the second hash value at the second network device; initiate an execution of a quantum optimization algorithm using a quantum optimizer to determine one or more hash value states associated with the electronic file for a third network device based on at least the first hash value, the second hash value, and information associated with the one or more network devices in the distributed network; and initiate a control signal configured to store the one or more hash value states in a database associated with the third network device.

In yet another aspect, a computerized method for enhanced detection of polymorphic malicious content within an entity is presented. The method comprising: receiving, using a processing device, information associated with an incidence of an electronic file in a distributed network comprising one or more network devices; receiving, using a processing device, an first hash value of the electronic file from a first network device and a second hash value of the electronic file from a second network device, wherein the first network device and the second network device is associated with the one or more network devices; comparing, using a processing device, the first hash value with the second hash value to determine a match; determining, using a processing device, that the electronic file is polymorphic based on at least determining that the first hash value at the first network device does not match the second hash value at the second network device; initiating, using a processing device, an execution of a quantum optimization algorithm using a quantum optimizer to determine one or more hash value states associated with the electronic file for a third network device based on at least the first hash value, the second hash value, and information associated with the one or more network devices in the distributed network; and initiating, using a processing device, a control signal configured to store the one or more hash value states in a database associated with the third network device.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Embodiments of the invention are directed to systems, methods and computer program products for enhanced detection of polymorphic malicious content within an entity. First responders in an entity looking for malware come across some that is polymorphic. Polymorphic malware typically changes its hash and makes it difficult for identification of the malware which morphs into multiple forms throughout the entity's computer network. Typical polymorphic malware may simply make a small change (one or two characters) to completely change the message digest (MD5) hash results. The electronic file may overall look similar, but it may be difficult to track from the original malware code. The present invention provides the functional benefit of using the multi-state nature of quantum computing to identify files that have mutated by small character changes to track the malware across the entity's computer network.

As used herein, a "malware" may refer to a malicious software/program/code which enters system without user authorization and takes undesirable actions. Malware typically refers to viruses, worms, spyware, adware, rootkits, botnets, or the like. In today's computing world malwares are a big threat and are continuously growing with high complexity. In polymorphic malwares, millions of decryptors can be generated by changing instructions in the next variant of the malware to avoid signature based detection.

As used herein, "MD5" may refer to an algorithm that verifies data integrity through the creation of a character message digest for an electronic file that is unique to that specific electronic file as a fingerprint is to the specific individual. In one aspect, it may be a unique identifier that is assignable to an electronic file, a group of files, or a portion of a file, based on the MD5 algorithm. When an electronic file is polymorphic, its character message digest is configured to change in the next variant, as it propagates through a distributed network. In some embodiments, each variant occurs with each step taken by the electronic file as it propagates through the distributed network.

In some embodiments, an "entity" as used herein may refer to an organization comprising multiple individuals such as an institution or an association that has a collective goal and external environment. Typically, organizations have a management structure that determines relationships between different activities and the members, and subdivides and assigns roles, responsibilities, and authority to carry out different tasks. For purposes of the invention, resources may indicate one or more hardware and/or software available to the user and enables the user to work towards the collective goal of the entity.

In some embodiments, the "user" may be an individual who operates the user input system described herein and is associated with an entity under a contract of employment, either part-time or full-time.

As used herein, the term "real-time" may be used to describe something (e.g., an operation, a process, a method, a technique, a computation, a calculation, an analysis, an optimization, etc.) that is performed using recently collected data to affect an imminent behavior.

As used herein, a "quantum computer" is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

Figure 1:
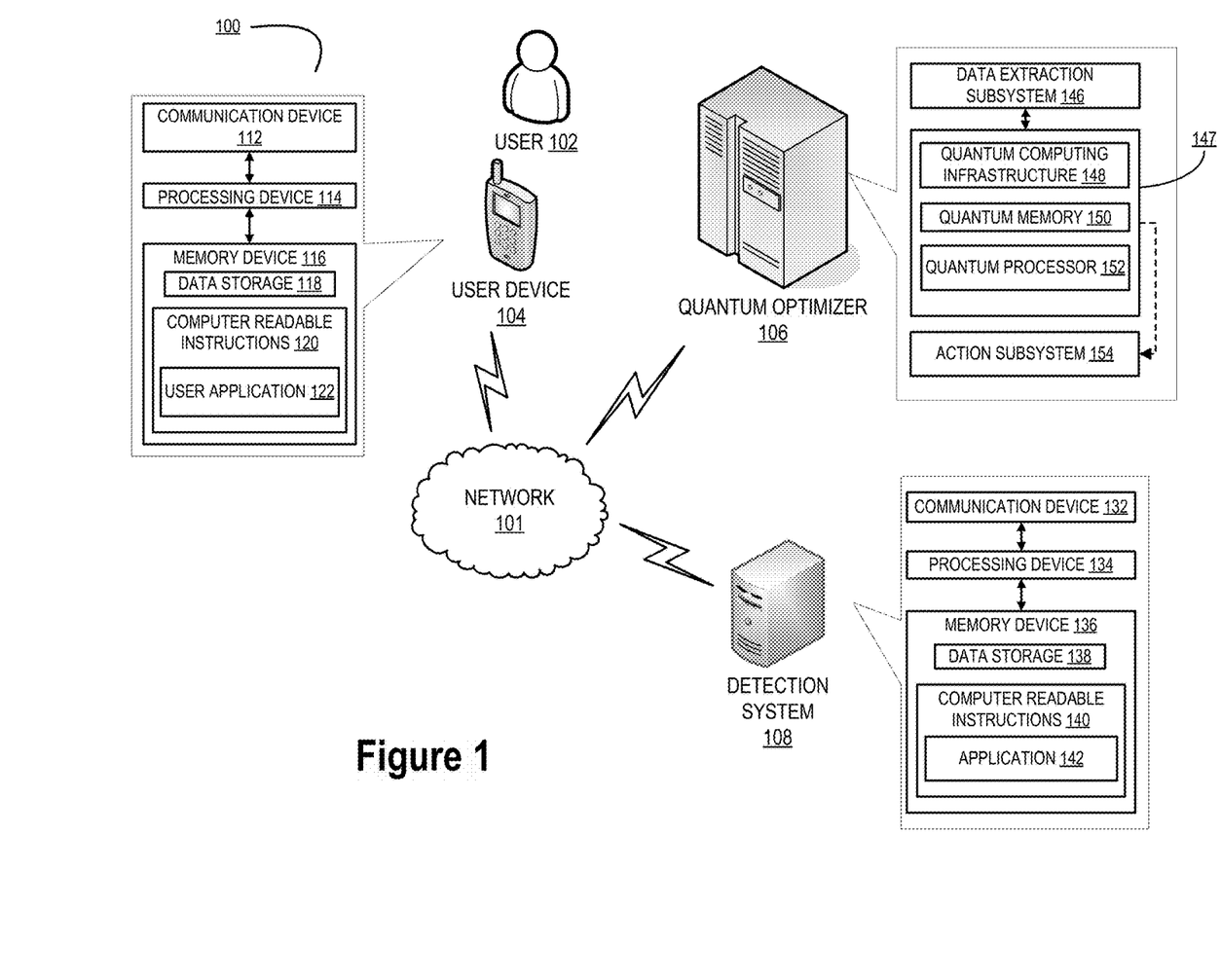
FIG. 1 illustrates technical components of a system for transfer of resources via a secure channel using an alias, in accordance with an embodiment of the invention.

FIG. 1 illustrates a system environment for enhanced detection of polymorphic malicious content within an entity 100, in accordance with embodiments of the present invention. As illustrated in FIG. 1, the detection system 108 is operatively coupled, via a network 101 to the user device 104, the quantum optimizer 106 and to the detection system 108. In this way, the detection system 108 can send information to and receive information from the user device 104, and the quantum optimizer 106. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

The user device 104 may refer to any computerized apparatus that can be configured to perform any one or more of the functions of the user device 104 described and/or contemplated herein. For example, the user may use the user device 104 to transmit and/or receive information or commands to and from the detection system 108, and the quantum optimizer 106. In some embodiments, the user device maybe a mobile phone, tablet, computer, or the like. In some other embodiments, the user device 104 may be a desktop personal computer, business computer, business system, business server, business network, a mobile system, such as a cellular phone, smart phone, personal data assistant (PDA), laptop, or the like. The user device 104 generally comprises a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the quantum optimizer 106, and detection system 108. As such, the communication device 112 generally comprises a modem, server, or other device for communicating with other devices on the network 101.

The user device 104 comprises computer-readable instructions 120 and data storage 118 stored in the memory device 116, which in one embodiment includes the computer-readable instructions 120 of a user application 122. In some embodiments, the user application 122 allows a user 102 to set up marker codes, send marker codes, and receive the necessary trigger responses.

As further illustrated in FIG. 1, an exemplary quantum optimizer 106 that can be used in parallel with the detection system 108 to solve optimization problems is presented. In this regard, the detection system 108 may be used to perform classical digital processing tasks described in the present systems and methods. The quantum optimizer 106 is comprised of a Data Extraction Subsystem 146, a quantum computing Subsystem 147, and an action subsystem 154. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the data extraction subsystem 146 communicates with the detection system 108 via the network 101 to extract data for optimization. In some embodiments, It will be understood that any method of communication between the data extraction subsystem 146 and the network is sufficient, including but not limited to wired communication, Radiofrequency (RF) communication, Bluetooth WiFi, and the like. The Data Extraction Subsystem 146 then formats the data for optimization in the Quantum Computing Subsystem.

As further depicted in FIG. 1, the quantum computing subsystem 101 comprises a quantum computing infrastructure 148, a quantum memory 150, and a quantum processor 152. The quantum computing infrastructure 148 comprises physical components for housing the quantum processor 152 and the quantum memory 150. The quantum computer infrastructure 148 further comprises a cryogenic refrigeration system to keep the quantum computing subsystem 154 at the desired operating temperatures. In general, the quantum processor 152 is designed to perform adiabatic quantum computation and/or quantum annealing to optimize data received from the data extraction subsystem 146. The quantum memory 150 is comprised of a plurality of qubits used for storing data during operation of the quantum computing subsystem 147. In general, qubits are any two-state quantum mechanical system. It will be understood that the quantum memory 150 may be comprised of any such two-state quantum mechanical system, such as the polarization of a single photon, the spin of an electron, and the like.

The action subsystem 154 communicates the optimized data from the quantum computing subsystem 147 back to the detection system 108 via the network 101. It will be understood that any method of communication between the data extraction subsystem 154 and the network is sufficient, including but not limited to wired communication, Radiofrequency (RF) communication, Bluetooth WiFi, and the like.

Further, as illustrated in FIG. 1, a detection system 108 is presented. In some embodiments, the detection system 108 generally comprises a communication device 132, a processing device 134, and a memory device 136. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 134 is operatively coupled to the communication device 132 and the memory device 136. The processing device 134 uses the communication device 132 to communicate with the network 101 and other devices on the network 101, such as, but not limited to the detection system 108, the quantum optimizer 106, and the user device 104. As such, the communication device 132 generally comprises a modem, server, or other device for communicating with other devices on the network 101.

As further illustrated in FIG. 1, the detection system 108 comprises computer-readable instructions 140 stored in the memory device 136, which in one embodiment includes the computer-readable instructions 140 of an application 142. In some embodiments, the memory device 136 includes data storage 138 for storing data related to the system environment 100, but not limited to data created and/or used by the application 142.

In one embodiment of the detection system 108 the memory device 136 stores an application 142. Furthermore, the detection system 108, using the processing device 134 codes certain communication functions described herein. In one embodiment, the computer-executable program code of an application associated with the application 142 may also instruct the processing device 134 to perform certain logic, data processing, and data storing functions of the application. The processing device 134 is configured to use the communication device 132 to communicate with and ascertain data from one or more quantum optimizer 106, and/or user device 104.

It is understood that the servers, systems, and devices described herein illustrate one embodiment of the invention. It is further understood that one or more of the servers, systems, and devices can be combined in other embodiments and still function in the same or similar way as the embodiments described herein. The detection system 108 may generally include a processing device communicably coupled to devices as a memory device, output devices, input devices, a network interface, a power source, one or more chips, and the like. The detection system 108 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the detection system 108 described herein.

In accordance with the present systems and methods, an on-board quantum optimizer may be employed to perform real-time optimizations to determine the hash value states of the electronic file as it propagates through the distributed network based on based on its initial morphing states more quickly, more reliably, and/or more accurately than a digital computing system. Because a quantum computing device inherently performs optimization in its natural evolution, quantum optimizer is particularly well-suited to solve optimization problems.

Figure 2:
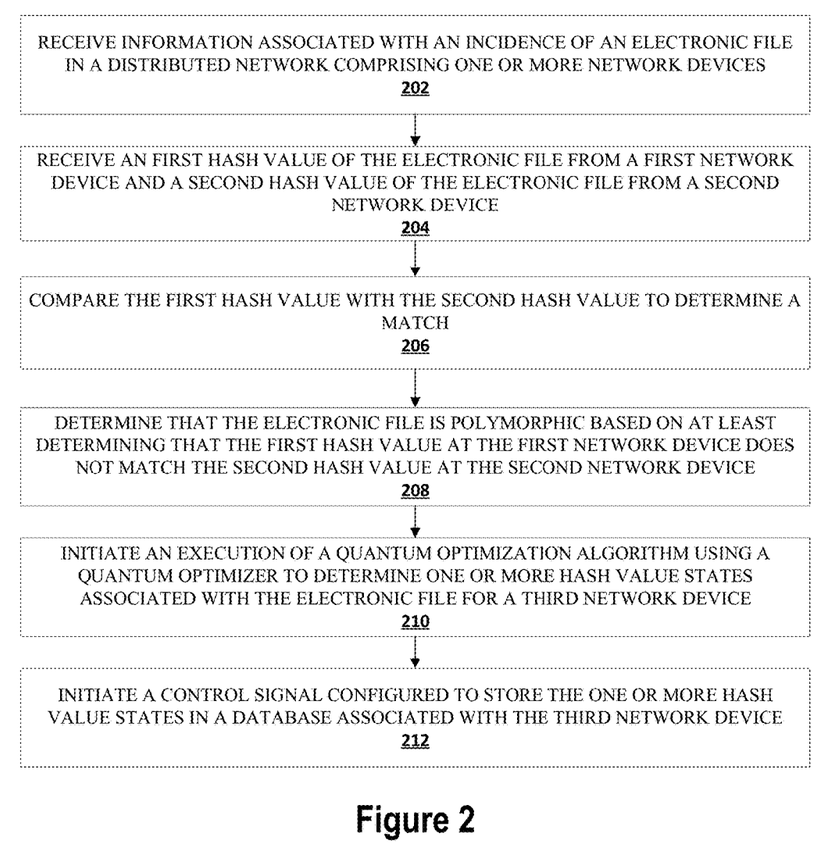
FIG. 2 illustrates a high level process flow enhanced detection of polymorphic malicious content within an entity, in accordance with an embodiment of the invention.

FIG. 2 illustrates a high level process flow enhanced detection of polymorphic malicious content within an entity 200, in accordance with an embodiment of the invention. As shown in block 202, the process flow includes receiving information associated with an incidence of an electronic file in a distributed network comprising one or more network devices. In this regard, each of the one or more network devices generate metadata at each incidence of an electronic file. In one aspect, the metadata is generated periodically, where the metadata for one or more electronic files are compiled and transmitted at the same time. In another aspect, the metadata may be generated and transmitted as and when an electronic file is incident at the one or more network devices. As used herein, "network devices" typically refer to one or more devices such as a hub, switch, router, bridge, proxy, gateway, and/or one or more computing devices, communicatively coupled to a distributed network.

Next, as shown in block 204, the process flow includes receiving a first hash value of the electronic file from a first network device and a second hash value of the electronic file from a second network device. In this regard, the first network device and the second network device is associated with the one or more network devices. In some embodiments, hash value may include a string of numbers and letters assigned to the electronic file at each network device, as the data propagates through the distributed network. In one aspect, the hash value of the electronic file may be referred to as the digital fingerprint of the electronic file. In this regard, the electronic file's hash value must remain the same at each incidence in the distributed network. In some embodiments, the hash values are generated based on at least one or more hash value algorithms executed on each of the one or more network devices. Common examples of hash value algorithms include message digest (MD5), SHA-1 (secure hash algorithm 1), or the like.

In some embodiments, the system may be configured to determine whether the electronic file has been modified by an authorized user. In this regard, the system may be configured to retrieve information associated with the electronic file from the metadata associated with the electronic file. As discussed herein, the metadata may include information associated with an origin of the file (e.g., computing device from which the electronic file was launched), a network route accessed by the electronic file, a name of one or more users who have accessed/modified the electronic file, name of the entity, the name of the computer used to access the electronic file, the name of the network server or drive where the electronic file is stored, personalized comments and the names and times of previous document users/authors, revisions, or versions. In response to retrieving the metadata, the system may be configured to determine whether the electronic file has been modified by an authorized user.

Once the system determines, based on the metadata of the electronic file, that the electronic file has not been modified by an authorized user, the process flow includes comparing the first hash value with the second hash value to determine a match, as shown in block 206. In some embodiments, the hash values of the electronic file as received from one or more network devices match if the electronic file has not been modified by any authorized user.

Next, as shown in block 208, the process flow includes determining that the electronic file is polymorphic based on at least determining that the first hash value at the first network device does not match the second hash value at the second network device. In this regard, the system may be configured to determine whether there is any indication in the metadata for the mismatch in the first hash value and the second hash value. In response to determining that the electronic file is polymorphic, the process flow includes initiating an execution of a quantum optimization algorithm using a quantum optimizer to determine one or more hash value states associated with the electronic file for a third network device based on at least the first hash value, the second hash value, and information associated with the one or more network devices in the distributed network, as shown in block 210. In some embodiments, the one or more hash value states indicate one or more possible hash values that the polymorphic electronic file may morph into as it propagates through the distributed network. In this regard, the quantum optimizer may be configured to minimize the number of permutations of the one or more hash value states, while maximizing the likelihood of detecting the malicious electronic file.

In one aspect, the system may be configured to determine one or more hash value states by altering each character of the hash value in each permutation. Typically, the hash value is in the form of a positional number system with a radix, or base. In one example, the hash value may in a hexadecimal format which uses sixteen distinct symbols, often the symbols 0-9 to represent the values zero to nine, and A, B, C, D, E, F to represent values ten to fifteen. Accordingly, the system may be configured to determine the one or more hash value states by altering a one or more character positions in the hash value. In some embodiments, the one or more hash value states are determined by altering individual character position in the hash value. In this regard, the system may be configured to sequentially cycle through each character position by varying the value of the character in the character position. In this regard, the system may be configured to begin from the most significant character position and cycle through the all possible permutations of the character before moving on to the adjacent character position. In another embodiment, the one or more hash value states are determined by processing a plurality of character positions in the hash value. In one aspect, the block size associated with the plurality of character positions may be constant for the duration of processing. In another aspect, the block size associated with the plurality of character positions may be variable. As described herein, the one or more hash value states are determined in part, based on the metadata of the electronic file. Accordingly, in some embodiments, the system may be configured to vary the block size associated with the plurality of character positions based on at least the information retrieved from the metadata of the electronic file.

In accordance with the present systems and methods, a quantum optimizer may be adapted for integration into detection system. The quantum optimizer may be configured for continuous operation, or it may be configured to be called upon/activated only when necessary to solve a specific problem (e.g., an optimization problem) that the quantum optimizer is particularly well-suited to solve. The quantum optimizer may, for example, be configured as a disposable, single-shot system (i.e., a system having a short lifespan or active time) for performing a single or small number of computations (if identified as necessary by the detection system) that govern a behavior of the detection system. Configuring the quantum optimizer as a disposable, single-shot system has the advantage of relaxing a number of design specifications that are otherwise necessary to provide the continuous, long-term operation typically expected in the known quantum computing arts. In accordance with the present systems and methods, the quantum optimizer may be configured to receive data from the detection system and perform a quantum computing operation in real-time.

Next, as shown in block 212, the process flow includes initiating a control signal configured to store the one or more hash value states in a database associated with the third network device. In this regard, the system may be configured to receive information associated with an incidence of the electronic file at a fourth network device, wherein the fourth network device is associated with the one or more network devices. In response, the system may be configured to receive a third hash value of the electronic file from the third network device. Next, the system may compare the third hash value with the one or more hash value states in the database to determine a match. Next, the system may be configured to determine that the electronic file is malware based on at least determining a match between the third hash value and at least one of the one or more hash value states in the database. In some embodiments, the system may be configured to initiate an intrusion detection protocol configured to deny the electronic file access to the third network device based on at least determining that the electronic file is malware.

In some embodiments, the system may be configured to determine a partial match between the third hash value and the one or more hash value states in the database. In response, the system may initiate a file quarantine process configured to temporarily restrict the electronic file access to the third network device. In one aspect, the system may be configured to initiate an alert on a user computing device indicating the initiation of the file quarantine process, and the restriction of the electronic file access. In some embodiments, the system may be configured to receive an indication from the user computing device indicating that the electronic file is malware. In response, the system may initiate an intrusion detection protocol configured to deny the electronic file access to the third network device based on at least receiving the indication that the electronic file is malware. In addition, the system may initiate a control signal configured to cause the third hash value to be added to the database.

In some embodiments, the third hash value may not match the one or more hash value states stored in the database associated with the third network device. In such cases, the system may be configured to first determine that the electronic file is polymorphic based on at least determining that the first hash value does not match the second hash value or the third hash value. In response, the system may be configured to add the third hash value to the database. Next, the system may be configured to retrieve a fourth hash value associated with a fourth network device associated with the distributed network, and repeat the optimization steps described herein. By increasing the number of existing hash values the electronic file has morphed into, the system may be configured to determine a pattern and/or an underlying similarity associated with the morphing of the hash values. In doing so, the system may be configured to initiate the quantum optimizer to solve the optimization problem of minimizing the number of hash values used to train the optimizer, while maximizing the likelihood of detecting the malicious file.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for enhanced detection of polymorphic malicious content within an entity, the system comprising:
    at least one non-transitory storage device;
    at least one processor; and
    at least one module stored in said storage device and comprising instruction code that is executable by the at least one processor and configured to cause said at least one processor to:
        receive information associated with an incidence of an electronic file in a distributed network comprising one or more network devices;
        receive a first hash value of the electronic file from a first network device and a second hash value of the electronic file from a second network device, wherein the first network device and the second network device is associated with the one or more network devices;
        compare the first hash value with the second hash value to determine a match between the two hash values for the electronic file received from the first and second network devices;
        determine that the electronic file is polymorphic based on at least determining that the first hash value at the first network device does not match the second hash value at the second network device;
        initiate an execution of a quantum optimization algorithm using a quantum optimizer to determine one or more hash value states associated with the electronic file for a third network device based on at least the first hash value, the second hash value, and information associated with the one or more network devices in the distributed network;
        initiate a control signal configured to store the one or more hash value states in a database associated with the third network device;
        receive information associated with an incidence of the electronic file at the third network device, wherein the third network device is associated with the one or more network devices;
        receive a third hash value of the electronic file from the third network device;
        compare the third hash value with the one or more hash value states in the database to determine a match;
        determine a partial match between the third hash value and the one or more hash value states in the database; and
        initiate a file quarantine process configured to temporarily restrict the electronic file access to the third network device.

2. The system of claim 1, wherein the module is further configured to:
    receive information associated with an incidence of the electronic file at the third network device, wherein the third network device is associated with the one or more network devices;
    receive a third hash value of the electronic file from the third network device;
    compare the third hash value with the one or more hash value states in the database to determine a match; and
    determine that the electronic file is malware based on at least determining a match between the third hash value and at least one of the one or more hash value states in the database.

3. The system of claim 2, wherein the module is further configured to:
    initiate an intrusion detection protocol configured to deny the electronic file access to the third network device based on at least determining that the electronic file is malware.

4. The system of claim 1, wherein the module is further configured to initiate an alert on a user computing device indicating the initiation of the file quarantine process, and the restriction of the electronic file access.

5. The system of claim 4, wherein the module is further configured to:
    receive an indication from the user computing device indicating that the electronic file is malware;
    initiate an intrusion detection protocol configured to deny the electronic file access to the third network device based on at least receiving the indication that the electronic file is malware; and
    initiate a control signal configured to cause the third hash value to be added to the database.

6. The system of claim 1, wherein the module is further configured to be communicatively coupled to a quantum optimizer, thereby enabling the transmission and reception of information.

7. A computerized method for enhanced detection of polymorphic malicious content within an entity, the method comprising:
    receiving, using a processing device, information associated with an incidence of an electronic file in a distributed network comprising one or more network devices;
    receiving, using a processing device, an first hash value of the electronic file from a first network device and a second hash value of the electronic file from a second network device, wherein the first network device and the second network device is associated with the one or more network devices;
    comparing, using a processing device, the first hash value with the second hash value to determine a match between the two hash values for the electronic file received from the first and second network devices;
    determining, using a processing device, that the electronic file is polymorphic based on at least determining that the first hash value at the first network device does not match the second hash value at the second network device;
    initiating, using a processing device, an execution of a quantum optimization algorithm using a quantum optimizer to determine one or more hash value states associated with the electronic file for a third network device based on at least the first hash value, the second hash value, and information associated with the one or more network devices in the distributed network;

initiating, using a processing device, a control signal configured to store the one or more hash value states in a database associated with the third network device;

receiving, using a processing device, information associated with an incidence of the electronic file at the third network device, wherein the third network device is associated with the one or more network devices;

receiving, using a processing device, a third hash value of the electronic file from the third network device;

comparing, using a processing device, the third hash value with the one or more hash value states in the database to determine a match;

determining, using a processing device, a partial match between the third hash value and the one or more hash value states in the database; and initiating, using a processing device, a file quarantine process configured to temporarily restrict the electronic file access to the third network device.

8. The computerized method of claim 7, wherein the method further comprises:

receiving information associated with an incidence of the electronic file at the third network device, wherein the third network device is associated with the one or more network devices;

receiving a third hash value of the electronic file from the third network device;

comparing the third hash value with the one or more hash value states in the database to determine a match; and determining that the electronic file is malware based on at least determining a match between the third hash value and at least one of the one or more hash value states in the database.

9. The computerized method of claim 8, wherein the method further comprises initiating an intrusion detection protocol configured to deny the electronic file access to the third network device based on at least determining that the electronic file is malware.

10. The computerized method of claim 7, wherein the method further comprises initiating an alert on a user computing device indicating the initiation of the file quarantine process, and the restriction of the electronic file access.

11. The computerized method of claim 10, wherein the method further comprises:

receiving an indication from the user computing device indicating that the electronic file is malware;

initiating an intrusion detection protocol configured to deny the electronic file access to the third network device based on at least receiving the indication that the electronic file is malware; and initiating a control signal configured to cause the third hash value to be added to the database.

12. A computer program product for enhanced detection of polymorphic malicious content within an entity, the computer program product comprising a non-transitory computer-readable medium comprising code causing a first apparatus to:

receive information associated with an incidence of an electronic file in a distributed network comprising one or more network devices;

receive an first hash value of the electronic file from a first network device and a second hash value of the electronic file from a second network device, wherein the first network device and the second network device is associated with the one or more network devices;

compare the first hash value with the second hash value to determine a match between the two hash values for the electronic file received from the first and second network devices;

determine that the electronic file is polymorphic based on at least determining that the first hash value at the first network device does not match the second hash value at the second network device;

initiate an execution of a quantum optimization algorithm using a quantum optimizer to determine one or more hash value states associated with the electronic file for a third network device based on at least the first hash value, the second hash value, and information associated with the one or more network devices in the distributed network;

initiate a control signal configured to store the one or more hash value states in a database associated with the third network device;

receive information associated with an incidence of the electronic file at the third network device, wherein the third network device is associated with the one or more network devices;

receive a third hash value of the electronic file from the third network device;

compare the third hash value with the one or more hash value states in the database to determine a match;

determine a partial match between the third hash value and the one or more hash value states in the database; and initiate a file quarantine process configured to temporarily restrict the electronic file access to the third network device.

13. The computer program product of claim 12, wherein the first apparatus is further configured to:

receive information associated with an incidence of the electronic file at the third network device, wherein the third network device is associated with the one or more network devices;

receive a third hash value of the electronic file from the third network device;

compare the third hash value with the one or more hash value states in the database to determine a match; and determine that the electronic file is malware based on at least determining a match between the third hash value and at least one of the one or more hash value states in the database.

14. The computer program product of claim 13, wherein the first apparatus is further configured to:

initiate an intrusion detection protocol configured to deny the electronic file access to the third network device based on at least determining that the electronic file is malware.

15. The computer program product of claim 12, wherein the first apparatus is further configured to initiate an alert on a user computing device indicating the initiation of the file quarantine process, and the restriction of the electronic file access.

16. The computer program product of claim 15, wherein the first apparatus is further configured to:

receive an indication from the user computing device indicating that the electronic file is malware;

initiate an intrusion detection protocol configured to deny the electronic file access to the third network device based on at least receiving the indication that the electronic file is malware; and initiate a control signal configured to cause the third hash value to be added to the database.

17. The computer program product of claim 12, wherein the first apparatus is further configured to be communicatively coupled to a quantum optimizer, thereby enabling the transmission and reception of information.

\* \* \* \* \*